(12) United States Patent
Suh et al.

(10) Patent No.: US 9,357,196 B2
(45) Date of Patent: May 31, 2016

(54) METHOD AND DEVICE FOR TRANSMITTING/RECEIVING DIGITAL BROADCAST SIGNAL

(75) Inventors: Jongyeul Suh, Seoul (KR); Jinpil Kim, Seoul (KR); Jeehyun Choe, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 274 days.

(21) Appl. No.: 14/003,354

(22) PCT Filed: Mar. 7, 2012

(86) PCT No.: PCT/KR2012/001655
§ 371 (c)(1),
(2), (4) Date: Sep. 5, 2013

(87) PCT Pub. No.: WO2012/121543
PCT Pub. Date: Sep. 13, 2012

(65) Prior Publication Data
US 2013/0342646 A1 Dec. 26, 2013

Related U.S. Application Data

(60) Provisional application No. 61/449,718, filed on Mar. 7, 2011, provisional application No. 61/476,318, filed on Apr. 17, 2011.

(51) Int. Cl.
*H04N 15/00* (2006.01)
*H04N 13/00* (2006.01)
*H04N 21/2362* (2011.01)
(Continued)

(52) U.S. Cl.
CPC ....... *H04N 13/0029* (2013.01); *H04N 13/0048* (2013.01); *H04N 13/0059* (2013.01); *H04N 13/0066* (2013.01); *H04N 13/0454* (2013.01); *H04N 21/2362* (2013.01); *H04N 21/2365* (2013.01); *H04N 21/4345* (2013.01); *H04N 21/4347* (2013.01); *H04N 21/440236* (2013.01); *H04N 21/816* (2013.01); *H04N 13/0452* (2013.01)

(58) Field of Classification Search
None
See application file for complete search history.

(56) References Cited

U.S. PATENT DOCUMENTS

2007/0002041 A1 * 1/2007 Kim .................. H04N 9/8205
345/419
2010/0315493 A1 * 12/2010 Hamada ............ H04N 13/0048
348/51
(Continued)

FOREIGN PATENT DOCUMENTS

CN 1893653 A 1/2007
CN 101924951 A 12/2010
(Continued)

Primary Examiner — Joseph Ustaris
Assistant Examiner — Talha M Nawaz
(74) Attorney, Agent, or Firm — Dentons US LLP

(57) ABSTRACT

The present invention relates to a device and a method for transmitting/receiving a digital broadcast signal having a three-dimensional image. According to one embodiment of the present invention, a device for receiving a digital broadcast signal comprises: a tuner which receives a digital broadcast signal of a transport packet that contains signaling data and a video stream for implementing a three-dimensional image; a demodulation unit which demodulates said received digital broadcast signal; a decoding module which extracts mode conversion information from said demodulated digital broadcast signal; and an output formatter which outputs a decoded image signal on the basis of said mode conversion information.

14 Claims, 22 Drawing Sheets

(51) Int. Cl.
*H04N 21/2365* (2011.01)
*H04N 21/434* (2011.01)
*H04N 21/4402* (2011.01)
*H04N 21/81* (2011.01)
*H04N 13/04* (2006.01)

(56) References Cited

U.S. PATENT DOCUMENTS

| | | | | |
|---|---|---|---|---|
| 2011/0043614 A1* | 2/2011 | Kitazato | ............ | H04N 13/0059 348/51 |
| 2011/0249091 A1* | 10/2011 | Kishimoto | ............ | G09G 5/005 348/43 |
| 2011/0310225 A1* | 12/2011 | Kitajima | ............ | H04N 13/004 348/43 |
| 2012/0033041 A1* | 2/2012 | Nagaraj | ............ | H04N 13/0029 348/43 |
| 2012/0057088 A1* | 3/2012 | Nakao | ............ | G09G 3/003 349/15 |
| 2012/0127288 A1* | 5/2012 | Cheng | ............ | H04N 13/026 348/56 |

FOREIGN PATENT DOCUMENTS

| | | |
|---|---|---|
| EP | 1739979 A2 | 1/2007 |
| EP | 2265032 A2 | 12/2010 |
| EP | 2288170 A2 | 2/2011 |
| JP | 2005006114 A | 1/2005 |
| JP | 2011-044952 A | 3/2011 |
| KR | 10-2006-0130451 A | 12/2006 |
| KR | 10-2008-0108882 A | 12/2008 |
| WO | 2007040472 A1 | 4/2007 |
| WO | 2010126227 A2 | 11/2010 |

* cited by examiner

FIG. 3

| Syntax | No. of bits | Mnemonic |
|---|---|---|
| transport_packet() { | | |
|     sync_byte | 8 | bslbf |
|     transport_error_indicator | 1 | bslbf |
|     payload_unit_start_indicator | 1 | bslbf |
|     transport_priority | 1 | bslbf |
|     PID | 13 | uimsbf |
|     transport_scrambling_control | 2 | bslbf |
|     adaptation_field_control | 2 | bslbf |
|     continuity_counter | 4 | uimsbf |
|     if(adaptation_field_control == '10' \|\| adaptation_field_control == '11'){ | | |
|         adaptation_field() | | |
|     } | | |
|     if(adaptation_field control == '01' \|\| adaptation_field_control == '11'){ | | |
|         for (i = 0; i < N; i++){ | | |
|             data_byte | 8 | bslbf |
|         } | | |
|     } | | |
| } | | |

FIG. 4

| Syntax | No. of bits | Format | |
|---|---|---|---|
| adaptation_field ( ) { | | | |
|     adaptation_field_length | 8 | uimsbf | |
|     if ( adaptation_field_length > 0 ) { | | | |
|         discontinuity_indicator | 1 | bslbf | |
|         random_access_indicator | 1 | bslbf | |
|         elementary_stream_priority_indicator | 1 | bslbf | |
|         PCR_flag | 1 | bslbf | |
|         OPCR_flag | 1 | bslbf | |
|         splicing_point_flag | 1 | bslbf | 1) transport_private_data_flag = '1' |
|         transport_private_data_flag | 1 | bslbf | |
|         adaptation_field_extension_flag | | | |
|         if (PCR_flag=='1') { | | | |
|             program_clock_reference_base | 33 | uimsbf | |
|             Reserved | 6 | bslbf | |
|             program_clock_reference_extansion | 9 | uimsbf | |
|         } | | | |
|         if (OPCR_flag=='1') { | | | |
|             original_program_clock_reference_base | 33 | uimsbf | |
|             Reserved | 6 | bslbf | |
|             original_program_clock_reference_extension | 9 | uimsbf | |
|         } | | | |
|         if (splicing_point_flag=='1') { | | | 2) signaling the number of byte of private_data_byte using transport_private_data_length (in case of present embodiment, it corresponds to '5') |
|             splice_countdown | 8 | tcimsbf | |
|         } | | | |
|         if (transport_private_data_flag=='1') { | | | |
|             transport_private_data_length | 8 | uimsbf | |
|             for (i=0; i < transport_private_data_length; i++) { | | | |
|                 private_data_byte | 8 | bslbf | |
|             } | | | 3) identify information on timing point of conversion by reading 2D-3D_transition_info_data_byte |
|         } | | | |
|         if (adaptation_field_extension_flag=='1') { | | | |
|             adaptation_field_extension_length | 8 | uimsbf | |
|             ltw_flag | 1 | bslbf | |
|             piecewise_rate_flag | 1 | bslbf | |
|             seamless_splice_flag | 1 | bslbf | 4) receiver controls output of video decoder and related display module for additional stream using this information |
|             Reserved | 5 | bslbf | |
|             if (ltw_flag=='1') { | | | |
|                 ltw_valid_flag | 1 | bslbf | |
|                 ltw_offset | 15 | uimsbf | |
|             } | | | |
|             if (piecewise_rate_flag=='1') { | | | |
|                 reserved | 2 | bslbf | |
|                 piecewise_rate | 22 | uimsbf | |
|             } | | | |
|             if (seamless_splice_flag=='1') { | | | |
|                 splice_type | 4 | bslbf | |
|                 DTS_next_AU[32..30] | 3 | bslbf | |
|                 marker_bit | 1 | bslbf | |
|                 DTS_next_AU[29..15] | 15 | bslbf | |
|                 marker_bit | 1 | bslbf | |
|                 DTS_next_AU[14..0] | 15 | bslbf | |
|                 marker_bit | 1 | bslbf | |
|             } | | | |
|             for ( i = 0; i < N; i++) { | | | |
|                 reserved | 8 | bslbf | |
|             } | | | |
|         } | | | |
|         for (i = 0; i < N; i++) { | | | |
|             stuffing_byte | 8 | bslbf | |
|         } | | | |
|     } | | | |
| } | | | |

FIG. 5

| Syntax | No. of bits | Format |
|---|---|---|
| 2D_3D_transition_info_data_byte ( ) { | | |
|     transition_type | 1 | bslbf |
|     data_type | 6 | uimsbf |
|     transition_count | 33 | uimsbf |
| } | | |

(a)

| data_type | Meaning |
|---|---|
| 0x00 | Number of transport packet |
| 0x01 | Number of video frames |
| 0x02 | PTS value for transition occurrence (with clock frequency of 90 kHz) |
| 0x03 ~ 0x3F | Reserved |

| Syntax | No. of bits | Format |
|---|---|---|
| user_data_registered_itu_t_t35 (){ | | |
|     user_t_t35_country_code | 8 | bslbf |
|     user_t_t35_provider_code | 16 | bslbf |
|     user_identifier | 32 | bslbf |
|     user_structure ( ) | | |
| } | | |

FIG. 12
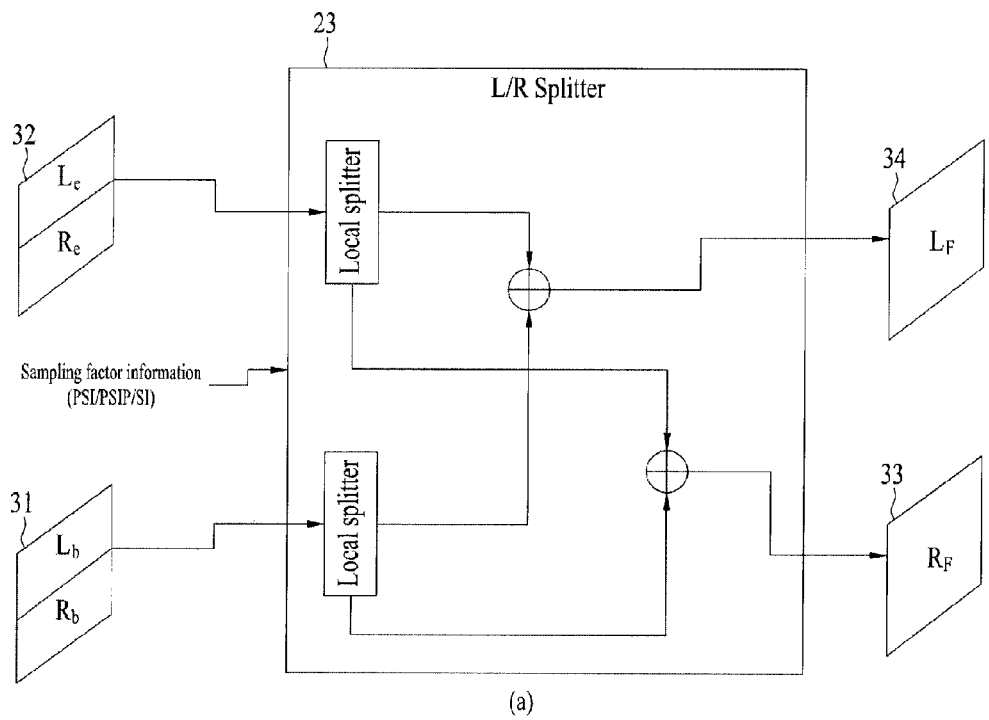
(a)
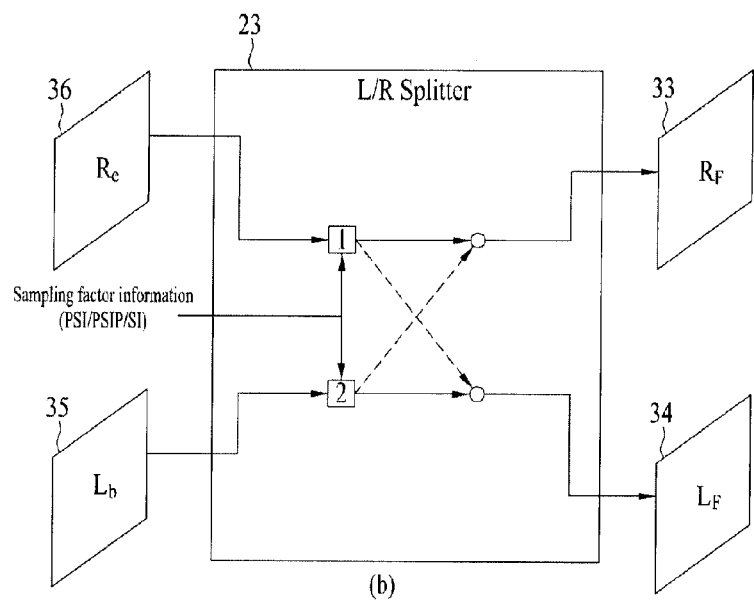
(b)

FIG. 13

| Syntax | No. of bits | Format |
|---|---|---|
| user_data_registered_itu_t_t35 (){ | | |
|    user_t_t35_country_code | 8 | bslbf |
|    user_t_t35_provider_code | 16 | bslbf |
|    user_identifier | 32 | bslbf |
|    user_structure ( ) | | |
| } | | |

(a)

| user_identifier | user_structure ( ) |
|---|---|
| 0x47413934 ('GA94') | DVB1_data( ) |
| 0x44544731 ('DTG1') | afd_data( ) |

(b)

| Syntax | No. of Bits | Identifier |
|---|---|---|
| DVB1_data( ) { | | |
|    user_data_type_code | 8 | uimsbf |
|    user_data_type_structure ( ) | | |
| } | | |

(c)

| user_data_type_code | user_data_type_structure ( ) |
|---|---|
| 0x00 to 0x02 | DVB Reserved |
| 0x03 | cc_data() |
| 0x04 | stereo_3D_info_data() |
| 0x05 | DVB Reserved |
| 0x06 | bar_data() |
| 0x07 to 0xFF | DVB Reserved |

| Syntax | No. of bits | Format |
|---|---|---|
| stereo_3D_info_data( ) { | | |
|     stereo_3D_mode | 1 | bslbf |
|     if (stereo_3D_mode==0) { | | |
|         LR_first | 1 | bslbf |
|         stereo_format | 2 | bslbf |
|         left_view_sampling_mode | 1 | bslbf |
|         right_view_sampling_mode | 1 | bslbf |
|         reserved | 2 | '11' |
|     } | | |
|     else if (stereo_3D_mode==1) { | | |
|         LR_flag | 1 | bslbf |
|         reserved | 6 | '111111' |
|     } | | |
| } | | |

FIG. 15

| sei_message() { | C | Descriptor |
|---|---|---|
|     payloadType= 0 | | |
|     while( next_bits( 8 ) = = 0xFF ) { | | |
|         ff_byte /* equal to 0xFF */ | 5 | f(8) |
|         payloadType += 255 | | |
|     } | | |
|     last_payload_type_byte | 5 | u(8) |
|     payloadType += last_payload_type_byte | | |
|     payloadSize = 0 | | |
|     while( next_bits( 8 ) = = 0xFF ) { | | |
|         ff_byte /* equal to 0xFF */ | 5 | f(8) |
|         payloadSize += 255 | | |
|     } | | |
|     last_payload_size_byte | 5 | u(8) |
|     payloadType += last_payload_size_byte | | |
|     sei_payload( payloadType, payloadSize ) | 5 | |
| } | | |

| sei_payload (payloadType, payloadSize) | C | Format |
|---|---|---|
|     if ( payloadType = =36) | | |
|         stereo_3D_info ( payloadSize) | 5 | |

| Syntax | C | Format |
|---|---|---|
| stereo_3D_info ( payloadSize ) { | | |
|     stereo_3D_mode | 5 | u(1) |
|     if (stereo_3D_mode==0) { | | |
|         LR_first | 5 | u(1) |
|         stereo_format | 5 | u(2) |
|         left_view_sampling_mode | 5 | u(1) |
|         right_view_sampling_mode | 5 | u(1) |
|     } | | |
|     else if (stereo_3D_mode==1) { | | |
|         LR_flag | 5 | u(1) |
|     } | | |
| } | | |

FIG. 16

| stream_content | component_type | Description |
|---|---|---|
| 0x05 | 0x80 | H.264/AVC plano - stereoscopic frame compatible high definition video, 16:9 aspect ratio, 25 Hz, Side - by - Side (see notes 2 and 3) |
| 0x05 | 0x81 | H.264/AVC plano - stereoscopic frame compatible high definition video, 16:9 aspect ratio, 25 Hz, Top - and - Bottom (see notes 2 and 3) |
| 0x05 | 0x82 | H.264/AVC plano - stereoscopic frame compatible high definition video, 16:9 aspect ratio, 30 Hz, Side - by - Side (see notes 2, 3 and 4) |
| 0x05 | 0x83 | H.264/AVC plano - stereoscopic frame compatible high definition video, 16:9 aspect ratio, 30 Hz, Top - and - Bottom (see notes 2, 3 and 4) |
| 0x05 | 0x84 | Enhancement layer, (enhancement to frame compatible high definition video, 16:9 aspect ratio, 25Hz, Side - by - Side) |
| 0x05 | 0x85 | Enhancement layer, (enhancement to frame compatible high definition video, 16:9 aspect ratio25Hz, Top - and - Bottom) |
| 0x05 | 0x86 | Enhancement layer, (enhancement to frame compatible high definition video, 16:9 aspect ratio, 30Hz, Side - by - Side) |
| 0x05 | 0x87 | Enhancement layer, (enhancement toframe compatible high definition video, 16:9 aspect ratio, 30Hz, Top - and - Bottom) |
| 0x05 | 0x88 | Enhancement layer, (enhancement to 2D service - compatible high definition video, 25Hz, base layer with left view) |
| 0x05 | 0x89 | Enhancement layer, (enhancement to 2D service - compatible high definition video, 25Hz, base layer with right view) |
| 0x05 | 0x8A | Enhancement layer, (enhancement to 2D service - compatible high definition video, 30Hz, base layer with left view) |
| 0x05 | 0x8B | Enhancement layer, (enhancement to 2D service - compatible high definition video, 30Hz, base layer with right view) |

NOTE 2: In table 26, the terms "standard definition", "high definition", "25 Hz" and "30 Hz" are used as defined in TS 101 154 [9] clauses 5.1 to 5.4 for MPEG - 2 and 5.5 to 5.7 for H.264/AVC and clauses 5.8 to 5.11 for VC - 1 respectively.
NOTE 3: See TR xxx xxx [xx] for further information on plano - stereoscopic modes.
NOTE 4: 24 Hz video will also use this component_type.

FIG. 17

| service_type | Description |
|---|---|
| 0x19 | advanced codec HD digital television service |
| 0x1A | advanced codec HD NVOD time - shifted service |
| 0x1B | advanced codec HD NVOD reference service |
| 0x1C | advanced codec frame compatible plano - stereoscopic HD digital television service (see note 3) |
| 0x1D | advanced codec frame compatible plano - stereoscopic HD NVOD time - shifted service (see note 3) |
| 0x1E | advanced codec frame compatible plano - stereoscopic HD NVOD reference service (see note 3) |
| 0x1F | advanced codec 3DTV Phase 2 (Phase 1 compatible) digital television service |
| 0x20 | advanced codec 3DTV Phase 2 (Phase 1 compatible) NVOD time - shifted service |
| 0x21 | advanced codec 3DTV Phase 2 (Phase 1 compatible) NVOD reference service |
| 0x22 | advanced codec 3DTV Phase 2 (2D service compatible) digital television service |
| 0x23 | advanced codec 3DTV Phase 2 (2D service compatible) NVOD time - shifted service |
| 0x24 | advanced codec 3DTV Phase 2 (2D service compatible) NVOD reference service |
| 0x25 | advanced codec enhancement service to frame compatible HD digital television service |
| 0x26 | advanced codec enhancement service to frame compatible HD NVOD time - shifted service |
| 0x27 | advanced codec enhancement service to frame compatible HD NVOD reference service |
| 0x28 | advanced codec enhancement service to 2D service compatible HD digital television service |
| 0x29 | advanced codec enhancement service to 2D service compatible HD NVOD time - shifted service |
| 0x2A | advanced codec enhancement service to 2D service compatible HD NVOD reference service |
| NOTE 3: For discussion of the use of these values, see Annex I.2.3 and TR xxx yyy (3D Guidelines of Frame Compatible 3D - TV) [54]. | |

FIG. 18

| Syntax | No. of bits | Mnemonic |
|---|---|---|
| transport_packet() { | | |
|     sync_byte | 8 | bslbf |
|     transport_error_indicator | 1 | bslbf |
|     payload_unit_start_indicator | 1 | bslbf |
|     transport_priority | 1 | bslbf |
|     PID | 13 | uimsbf |
|     transport_scrambling_control | 2 | bslbf |
|     adaptation_field_control | 2 | bslbf |
|     continuity_counter | 4 | uimsbf |
|     if(adaptation_field control == '10' \|\| adaptation_field_control == '11'){ | | |
|         adaptation_field() | | |
|     } | | |
|     if(adaptation_field control == '01' \|\| adaptation_field_control == '11'){ | | |
|         for (i = 0; i < N; i++){ | | |
|             data_byte | 8 | bslbf |
|         } | | |
|     } | | |
| } | | |

FIG. 19

| Syntax | No. of bits | Format | |
|---|---|---|---|
| adaptation_field ( ) { | | | |
|     adaptation_field_length | 8 | uimsbf | |
|     if ( adaptation_field_length > 0 ) { | | | |
|         discontinuity_indicator | 1 | bslbf | |
|         random_access_indicator | 1 | bslbf | |
|         elementary_stream_priority_indicator | 1 | bslbf | |
|         PCR_flag | 1 | bslbf | |
|         OPCR_flag | 1 | bslbf | |
|         splicing_point_flag | 1 | bslbf | 1) transport_private_data_flag = '1' |
|         transport_private_data_flag | 1 | bslbf | |
|         adaptation_field_extension_flag | | | |
|         if (PCR_flag== '1') { | | | |
|             program_clock_reference_base | 33 | uimsbf | |
|             Reserved | 6 | bslbf | |
|             program_clock_reference_extansion | 9 | uimsbf | |
|         } | | | |
|         if (OPCR_flag== '1') { | | | |
|             original_program_clock_reference_base | 33 | uimsbf | |
|             Reserved | 6 | bslbf | |
|             original_program_clock_reference_extension | 9 | uimsbf | |
|         } | | | |
|         if (splicing_point_flag== '1') { | | | 2) signaling the number of byte of private_ |
|             splice_countdown | 8 | tcimsbf | data_byte using transport_private_ |
|         } | | | data_length |
|         if (transport_private_data_flag== '1') { | | | |
|             transport_private_data_length | 8 | uimsbf | |
|             for (i=0; i < transport_private_data_length; i++) { | | | |
|                 private_data_byte | 8 | bslbf | |
|             } | | | 3) identify information on 3D mode and |
|         } | | | stereo broadcasting configuration by |
|         if (adaptation_field_extension_flag== '1') { | | | reading stereo_3D_info_data() |
|             adaptation_field_extension_length | 8 | uimsbf | |
|             ltw_flag | 1 | bslbf | |
|             piecewise_rate_flag | 1 | bslbf | |
|             seamless_splice_flag | 1 | bslbf | 4) receiver controls output of L/R splitter |
|             Reserved | 5 | bslbf | module receiving base stream and |
|             if (ltw_flag== '1') { | | | enhancement stream as input value |
|                 ltw_valid_flag | 1 | bslbf | using this information |
|                 ltw_offset | 15 | uimsbf | |
|             } | | | |
|             if (piecewise_rate_flag== '1') { | | | |
|                 reserved | 2 | bslbf | |
|                 piecewise_rate | 22 | uimsbf | |
|             } | | | |
|             if (seamless_splice_flag== '1') { | | | |
|                 splice_type | 4 | bslbf | |
|                 DTS_next_AU[32..30] | 3 | bslbf | |
|                 marker_bit | 1 | bslbf | |
|                 DTS_next_AU[29..15] | 15 | bslbf | |
|                 marker_bit | 1 | bslbf | |
|                 DTS_next_AU[14..0] | 15 | bslbf | |
|                 marker_bit | 1 | bslbf | |
|             } | | | |
|             for ( i = 0; i < N; i++) { | | | |
|                 reserved | 8 | bslbf | |
|             } | | | |
|         } | | | |
|         for (i = 0; i < N; i++) { | | | |
|             stuffing_byte | 8 | bslbf | |
|         } | | | |
|     } | | | |
| } | | | |

METHOD AND DEVICE FOR TRANSMITTING/RECEIVING DIGITAL BROADCAST SIGNAL

This application is a National Stage entry of International Application No. PCT/KR2012/001655, filed on Mar. 7, 2012, which claims priority to U.S. Provisional Application Nos. 61/449,718 filed Mar. 7, 2011 and 61/476,318 filed Apr. 17, 2011, which is incorporated herein in their entirety by reference.

TECHNICAL FIELD

The present invention relates to a method of transmitting and receiving a digital broadcasting signal including a 3 dimensional image and apparatus therefor. More particularly, if a screen conversion between a 2 dimensional image and the 3 dimensional image is taking place when the digital broadcasting signal including the 3 dimensional image is displayed, the present invention relates to a method of transmitting and receiving a digital broadcasting signal configured to signal the screen conversion and apparatus therefor. If a conversion between a frame-compatible compatible service and a 2D service compatible service occurs, the present invention relates to a method of transmitting and receiving a digital broadcasting signal configured to signal the conversion and apparatus therefor.

BACKGROUND ART

As the dissemination of a 3 dimensional television (3DTV) is raging, a transmission of a 3D image content performed by a digital broadcasting as well as the dissemination of the 3D image content performed by a storing media is vitalized.

In general, a 3 dimensional image provides a 3D effect using a principle of stereo vision of two eyes. Since a human feels perspective via parallax of two eyes, in other word, binocular parallax due to a space between two eyes apart from each other about 65 mm, the 3D image may provide the 3D effect and the perspective in a manner of providing an image, which makes a left eye and a right eye see a related plane image, respectively.

The 3D image display method includes a stereoscopic technique, a volumetric technique, a holographic technique, and the like. In case of the stereoscopic technique, it provides a left view image supposed to be watched by a left eye and a right view image supposed to be watched by a right eye. The stereoscopic technique enables to recognize a 3D image effect in a manner of making the left eye and the right eye watch the left view image and the right view image respectively using a polarized glasses or a display device itself.

In case of a stereoscopic 3D image content, if two similar images having viewpoints different from each other are transmitted, the stereoscopic technique uses a technique that a receiver displays a 3D image using the two images. In case that the 3D image is displayed by the receiver, the 3D image is provided in a manner that the binocular disparity occurs due to a disparity between a left view image and a right view image.

A digital broadcasting may be able to include a 2D image program and a 3D image program. For instance, after broadcasting a movie made by a 3D image, a following advertising image may correspond to a 2D image. In this case, a broadcasting receiver should precisely catch a timing point of a conversion from the 3D image to the 2D image. If the timing point is not clear, it is unable to provide a normal image program to a user. In particular, if the receiver is still configured to display the 3D image program but a received program corresponds to a 2D, either a left view image or a right view image no longer exists and then an abnormal screen is displayed.

And, in case that the receiver supports a full resolution, the receiver may be able to operate in a frame-compatible compatible mode or a 2D service compatible mode according to a broadcast signal transmitted by a broadcasting station. In this case, the receiver should precisely catch a timing point of conversion between modes as well. Otherwise, it is unable to provide a normal screen to the user since a received signal and a mode of the receiver are not matched with each other.

DISCLOSURE OF THE INVENTION

Technical Task

The present invention is intended to solve the aforementioned problems. The technical task that the present invention intends to achieve is to display a 2D or a 3D image in a manner of receiving a digital broadcasting signal including a signaling information configured to display the 3D image without experiencing the aforementioned problem according to a method of receiving the digital broadcasting signal and apparatus therefor.

Technical Solution

In order to solve the aforementioned technical task, a digital broadcasting signal receiving device according to one embodiment of the present invention includes a tuner configured to receive a digital broadcasting signal of a transport packet containing a video stream, which implements a 3 dimensional image, and a signaling data, a demodulator configured to demodulate the received digital broadcasting signal, a decoding module configured to extract a mode conversion information from the demodulated digital broadcasting signal, and an output formatter configured to output an image signal decoded based on the mode conversion information.

And, the mode conversion information according to one embodiment of the present invention includes an information on a timing point of conversion between a 2 dimensional image signal and a 3 dimensional image signal.

And, the mode conversion information according to one embodiment of the present invention is received in a manner of being included in an adaptation_field( ) in a transport packet level or in a video header in a video level.

And, the decoding module according to one embodiment of the present invention includes a $1^{st}$ decoder and a $2^{nd}$ decoder configured to be controlled whether to operate according to the mode conversion information.

And, the mode conversion information according to one embodiment of the present invention includes an information on a conversion between a frame-compatible compatible mode and a 2D service compatible mode.

And, the mode conversion information according to one embodiment of the present invention is received in a manner of being included in an adaptation_field( ) in a transport packet level, in a SI information in a system level, or in a video header in a video level.

And, the decoding module according to one embodiment of the present invention includes an L/R splitter configured to separate and merge an inputted image signal in case of the frame-compatible compatible mode and configured to bypass or switch an input image in case of the 2D service compatible mode according to the mode conversion information.

In order to solve the aforementioned technical task, a method of receiving a digital broadcasting signal according to one embodiment of the present invention includes the steps of receiving a digital broadcasting signal of a transport packet containing a video stream, which implements a 3 dimensional image, and a signaling data, demodulating the received digital broadcasting signal, extracting a mode conversion information from the demodulated digital broadcasting signal, and outputting an image signal decoded based on the mode conversion information.

And, the mode conversion information according to one embodiment of the present invention includes an information on a timing point of conversion between a 2 dimensional image signal and a 3 dimensional image signal.

And, the mode conversion information according to one embodiment of the present invention is received in a manner of being included in an adaptation_field( ) in a transport packet level or in a video header in a video level.

And, the method of receiving a digital broadcasting signal according to one embodiment of the present invention further includes the step of controlling an operation of a $1^{st}$ decoder and a $2^{nd}$ decoder according to the mode conversion information after the step of extracting the mode conversion information.

And, the mode conversion information according to one embodiment of the present invention includes an information on a conversion between a frame-compatible compatible mode and a 2D service compatible mode.

And, the mode conversion information according to one embodiment of the present invention is received in a manner of being included in an adaptation_field( ) in a transport packet level, in a SI information in a system level, or in a video header in a video level.

And, the method of receiving a digital broadcasting signal according to one embodiment of the present invention further includes the step of separating and merging an inputted image signal in case of the frame-compatible compatible mode and bypassing or switching an input image in case of the 2D service compatible mode according to the mode conversion information after the step of extracting the mode conversion information.

Advantageous Effects

According to the present invention, a method of receiving a digital broadcasting signal and apparatus therefor has an effect as follows.

According to one embodiment of the present invention, a timing point of conversion between 2D and 3D can be precisely identified by receiving a digital broadcasting signal.

According to one embodiment of the present invention, a timing point of conversion between a frame-compatible compatible mode and a 2D service compatible mode can be precisely identified by receiving a digital broadcasting signal.

According to one embodiment of the present invention, it may be able to appropriately control an operation of a receiver in real time according to a received digital broadcasting signal.

DESCRIPTION OF DRAWINGS

FIG. 3 is a diagram of a syntax structure of an MPEG-2 transport packet according to one embodiment of the present invention;

FIG. 4 is a diagram of a syntax structure of an adaptation_field of an MPEG-2 transport packet according to one embodiment of the present invention;

FIG. 5(*a*) is a diagram of a syntax structure of a 2D_3D_transition_info_data_byte according to one embodiment of the present invention;

FIG. 5(*b*) is a diagram of an interpretation for a value of a data_type field according to one embodiment of the present invention;

FIG. 7 is a diagram of a method of transporting a 2D_3D_transition_info_data_byte according to one embodiment of the present invention in an AVC/H.264 video;

FIG. 12 is a diagram of a method of supporting 2 types of full resolution 3D image signals (HD stereo mode) based on an MVC codec according to one embodiment of the present invention;

FIG. 13 is a diagram of a syntax structure to signal in a video level according to one embodiment of the present invention;

FIG. 14 is a diagram of a syntax structure of a stereo_3D_info_data( ) according to one embodiment of the present invention;

FIG. 15 is a diagram of a method of signaling a 3D service mode by configuring an SEI message according to one embodiment of the present invention;

FIG. 16 is a diagram of a definition for a stream_content and a component_type according to one embodiment of the present invention;

FIG. 17 is a diagram of a kind of a service type according to one embodiment of the present invention;

FIG. 18 is a syntax structure of a transport_packet( ) according to one embodiment of the present invention;

FIG. 19 is a syntax structure of an adaptation_field( ) according to one embodiment of the present invention;

BEST MODE

Figure 1:
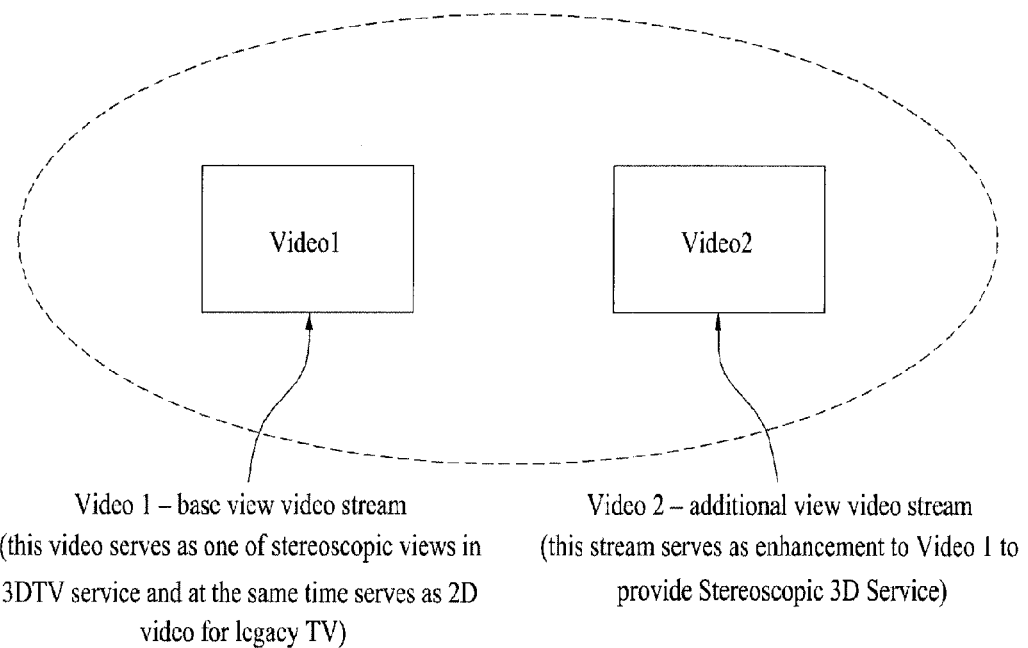
FIG. 1 is a diagram of an embodiment for a method of configuring a stereoscopic 3DTV service based on a dual codec according to a conventional invention.

Reference will now be made in detail to the preferred embodiments of the present invention, examples of which are illustrated in the accompanying drawings. Yet, the present invention may be non-limited or non-restricted by the embodiments.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

The method of expression for a 3 dimensional image may include a stereoscopic technique considering two viewpoints and a multiple view image technique (or a multi-view technique) considering more than 3 viewpoints. Comparably, a conventional single view image technique may be called a monoscopic image technique.

The stereoscopic technique uses a pair of image, i.e., a left view image (hereinafter a left image) and a right view image (hereinafter a right image) obtained by photographing a same subject with a left camera and a right camera, which are away a certain distance from each other. Or, the stereoscopic technique uses a pair of image of a base view video stream and an additional view video stream. The multi-view technique uses more than 3 images obtained by photographing with 3 or more cameras having a certain distance and angle. In the following description, although the present invention explains the stereoscopic technique as one embodiment, the idea of the present invention may also be applied to the multi-view technique.

According to the present invention, the stereoscopic technique includes a side-by-side, a top-down, a checker board technique, and the like. The side-by-side technique is a technique configuring one stereoscopic image by performing a half down sampling horizontally on each of a left image and a right image, respectively and situating one sampled image in a left region and the other sampled image in a right region. The top-down technique is a technique configuring one stereoscopic image by performing a half down sampling vertically on each of a left image and a right image, respectively and situating one sampled image in a top region and the other sampled image in a bottom region. The checker board technique is a technique configuring one image by performing a half down sampling in a manner that a left image and a right image respectively intersect horizontally and vertically.

Yet, the stereoscopic technique according to the present invention may be non-limited or non-restricted by the aforementioned example. As one example, it is also possible to provide a 3D image service in a manner of transceiving two images having an intact resolution without going through the aforementioned down sampling process. Transceiving two images having an intact resolution can be called a full resolution 3D image service. The full resolution 3D image service can be transmitted to a user in two ways. For clarity of terminology, a receiver mode for providing the full resolution 3D image service is briefly explained.

First of all, a frame-compatible mode is a method of transceiving two 3D images, which went through the aforementioned down sampling, of a stereoscopic scheme. A receiver represents both a left image and a right image with a full resolution in a manner of combining two images down sampled by half and provides the images as a full resolution 3D image using a binocular parallax.

A 2D service compatible mode means to transmit a left image of full resolution and a right image of full resolution, respectively. A receiver receives the above mentioned left image and the right image and may be able to represent as a full resolution 3D image using the binocular parallax. Detail explanation is described together with a signaling signal for conversion between modes in the following description.

First of all, as a $1^{st}$ embodiment of the present invention, in case that a received signal is converted between a 2D image and a 3D image, a preparation work for a decoder operation and a method of signaling a timing point of the decoder operation to smoothly perform the operation are explained.

In case that a 2D/3D conversion occurs in a stereoscopic 3DTV system based on a single or a dual system, if a disagreement between the 2D/3D conversion by an actual frame unit and a signaling data or a synchronization error occurs, there may exist a problem as follows.

In a section converting from a 3D mode to a 2D mode, a) a receiver may perform a 2D operation even though an actual program corresponds to 3D, since a received signaling data judged the program as 2D, b) the receiver may perform a 3D operation even though an actual program corresponds to 2D, since a received signaling data judged the program as 3D.

In a section converting from a 2D mode to a 3D mode, c) the receiver may perform a 3D operation even though an actual program corresponds to 2D, since a received signaling data gives information of 3D, d) the receiver may perform a 2D operation even though an actual program corresponds to 3D, since a received signaling data gives information of 2D. Hence, a method capable of precisely signaling the 2D/3D conversion by a frame unit is required.

In the following description, a method of signaling the 2D/3D conversion in a stereoscopic 3DTV system based on a dual codec is described. The method may include 1) a method of signaling 2D/3D conversion information in an MPEG-2 transport packet level, 2) a method of signaling the 2D/3D conversion information in a video level. This method can be identically applied to a stereoscopic 3DTV system based on a single codec as well.

FIG. 1 is a diagram of an embodiment for a method of configuring a stereoscopic 3DTV service based on a dual codec according to a conventional invention.

The stereoscopic 3DTV service based on a dual codec includes two videos. A video 1 corresponds to a base view video stream and is used as one of stereoscopic viewpoints in the 3DTV service. The video 1 can be used as a 2D image in a legacy TV service. A video 2 corresponds to an additional view video stream and is used as an enhancement of the video 1 to provide the stereoscopic 3DTV service.

A 3D image program includes both the video 1 and the video 2. In case that the 3D image program is based on a single codec, the video 1 and the video 2 can be encoded using an identical codec. In case that the 3D image program is based on a dual codec, the video 1 and the video 2 can be transmitted in a manner of being compressed by an individual method, respectively.

Figure 2:
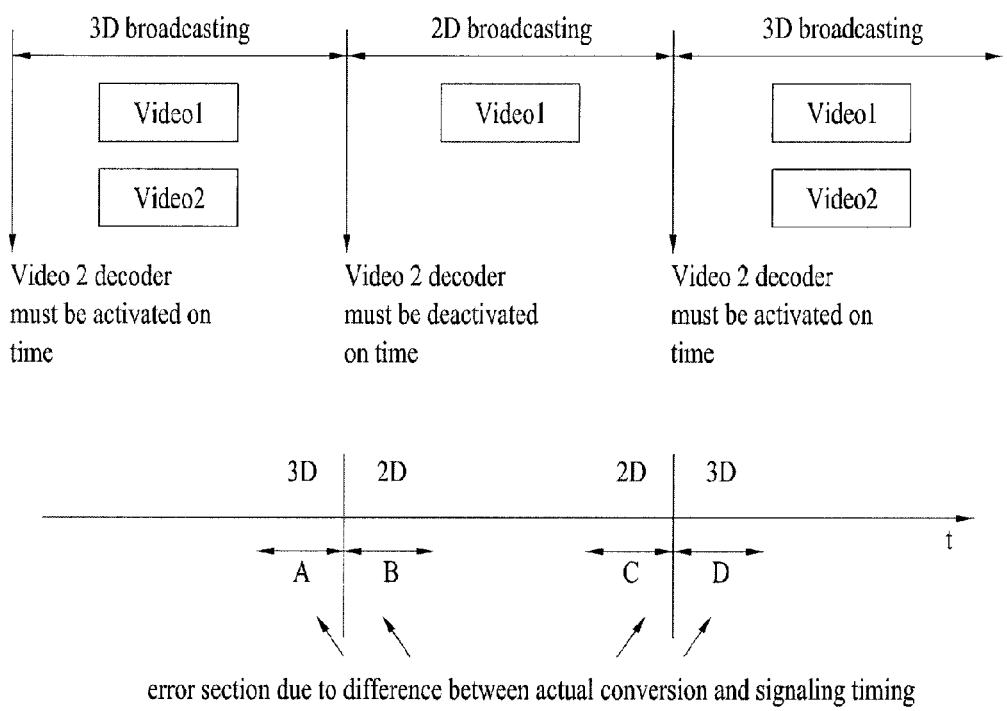
FIG. 2 is a conceptual diagram for a conversion between 2D and 3D in a stereoscopic 3DTV system based on a dual stream according to one embodiment of the present invention.

FIG. 2 is a conceptual diagram for a conversion between 2D and 3D in a stereoscopic 3DTV system based on a dual stream according to one embodiment of the present invention.

Referring to FIG. 2, when a 3D broadcasting is started, the video 1 and the video 2 are received together. Hence, a decoder for the video 2 should start to operate on the exact time according to the start time of the 3D broadcasting. In case of converting to a 2D broadcasting again after ending of the 3D broadcasting, since the video 1 is received only, the decoder for the video 2 has to stop operating in time. The bottom part of the diagram distinguishes cases related to between a receiving timing point of the 2D or 3D broadcasting program and an actual operating timing point of the decoder according to time.

In case that a receiving program is converted to 2D, a case A corresponds to a case that a conversion timing point indicated by a signaling data is earlier than the timing point of an actual conversion. In particular, a receiver outputs a last part of a 3D program in a 2D mode in the timing point that the actual 3D program is not over yet. Although this part is not an intended operation, if it is considered for an outputted image only, since a normal image is outputted in the 2D mode even though it is not a 3D image, the case A can be regarded as a relatively less critical case.

In case that a receiving program is converted to 2D, a case B corresponds to a case that a conversion timing point indicated by a signaling data is later than the timing point of an actual conversion. In this case, the decoder for the video 2 is off belatedly. A malfunction may occur in a section that the decoder is incorrectly on. In particular, although an actually received signal corresponds to a 2D signal, a receiver considers the signal as a 3D signal and may be then able to perform a wrong operation in a signal processing process. For instance, a static image of a lastly received 3D image is maintained as an additional view video stream screen (underflow) and a 2D dedicated image, which is currently receiving, is displayed as a base view video stream. Hence, a situation that a 3D screen of an abnormal combination is outputted may occur.

In case that a receiving program is converted to 3D, a case C corresponds to a case that a conversion timing point indicated by a signaling signal is earlier than the timing point of an actual conversion. In this case, if a decoder starts to operate in advance, a malfunction may occur in a section that the decoder is incorrectly on. In particular, like as mentioned in the case of malfunctioning on 2D conversion, although an actually received signal corresponds to a 2D signal, a receiver considers the signal as a 3D signal and may be then able to perform a wrong operation in a signal processing process. For instance, a phenomenon that a decoder runs idle (underflow) without an additional view video stream may occur. In this case, 3D may operate under a situation that an additional view video stream is displayed with a black color screen only.

In case that a receiving program is converted to 3D, a case D corresponds to a case that a conversion timing point indicated by a signaling data is later than the timing point of an actual conversion. This corresponds to a case that a 2D mode is temporarily maintained although an actual 3D program is started. Similar to the case A, although this part is not an intended operation, if it is considered in terms of a display, since a normal 2D image is outputted, the case D can be regarded as a relatively less critical problem.

As a first method to solve the aforementioned problem, it is able to safely convert a mode between 2D and 3D in a manner of avoiding a critical error via a receiver implementation while a legacy signaling scheme is maintained and controlling a timing point of conversion.

In order to perform a 2D/3D conversion on an exact timing point, it is a principle that the 2D/3D conversion is performed as frame accurate as possible. Yet, under a situation that a signaling scheme for the principle does not exist, it is hardly expected that an exact conversion is performed. Hence, as the second best plan, in case of converting from 2D to 3D, a conversion is performed in a manner of delaying (embodiment: about 1~2 seconds) the conversion as much as a preconfigured time compared to the timing point identified by an actual signaling data to avoid a critical error. By doing so, a critical error case corresponding to the case C can be avoided.

In case of converting from 2D to 3D, although a signaling information on an additional video is included via an SI level signaling, a mode conversion is not performed immediately. When a PID stream corresponding to the additional video is detected, a conversion to the 3D is performed. In particular, if a PID corresponding to the additional video (e.g., AVC/H.264 video) is detected in a demux, the conversion to the 3D is performed.

In case of converting from 3D to 2D, a conversion is performed earlier (embodiment: about 1~2 seconds) than a timing point of conversion identified by an actual signaling data to avoid a critical error. By doing so, a critical error case corresponding to the case B can be avoided.

As a second method, there exists a 2D/3D conversion signaling method using an adaptation layer of a transport packet.

FIG. 3 is a diagram of a syntax structure of an MPEG-2 transport packet according to one embodiment of the present invention. In this case, a transport packet level signaling method is able to signal a 2D/3D conversion signal using an adaptation_field of a transport packet.

FIG. 4 is a diagram of a syntax structure of an adaptation_field of an MPEG-2 transport packet according to one embodiment of the present invention. A transport_private_data_flag of the adaptation_field( ) is set to '1' for synchronization. By using a transport_private_data_length, it is signaled that how many bytes are in a private_data_byte. Since a bit number of a signaled conversion signal in an embodiment of the present invention corresponds to '40', the transport_private_data_length has a value of '5'. It is because the private_data_byte having a size of 8-bit is able to represent a conversion signal of 40-bit in a manner of repeating 5 times, which corresponds to the value of the transport_private_data_length. The private_data_byte includes a 2D_3D_transition_info_data_byte to be explained in FIG. 5 and a receiver identifies information on a timing point of conversion by analyzing the 2D_3D_transition_info_data_byte. By doing so, the receiver controls an output of a video decoder for an additional view video stream and a related display module.

FIG. 5(a) is a diagram of a syntax structure of a 2D_3D_transition_info_data_byte according to one embodiment of the present invention.

The 2D_3D_transition_info_data_byte can be positioned at the private_data_byte part in the adaptation field region of the MPEG-2 transport packet and includes information for indicating a timing point of conversion between 2D and 3D. A transition_type may be able to indicate whether a conversion of a received broadcasting signal is to 2D or to 3D. If the transition_type field is set to '0', it means the conversion from 2D to 3D. If the transition_type field is set to '1', it means conversion from 3D to 2D. A data_type may be able to indicate a unit of a transition_count. A detail meaning of the data_type is shown in FIG. 5(b). The transition_count means a timing point that an actual conversion is taking place.

FIG. 5(b) is a diagram of an interpretation for a value of a data_type field according to one embodiment of the present invention. For instance, in case of the data_type='0*00', a 2D (or a 3D) transition occurs after the packets as many as the number specified by a value of the transition_count. The packet including the 2D_3D_transition_info_data_byte is not included in a process of counting a remaining time. Moreover, the packet having an identical PID value with a corresponding packet is counted only.

In case of the data_type='0*01', it means that a transition occurs after a picture frame as many as the number specified by the value of the transition_count.

In case of the data_type='0*02', the transition_count clearly informs a PTS value corresponding to a timing point that an actual transition occurs. In this case, a PCR value to be used is on the basis of a recently received PCR. In case that the PCR is updated, the PCR value should be transmitted again according to the need.

As a third method, it is able to use a method of signaling 2D/3D conversion information in a video level.

Figure 6:
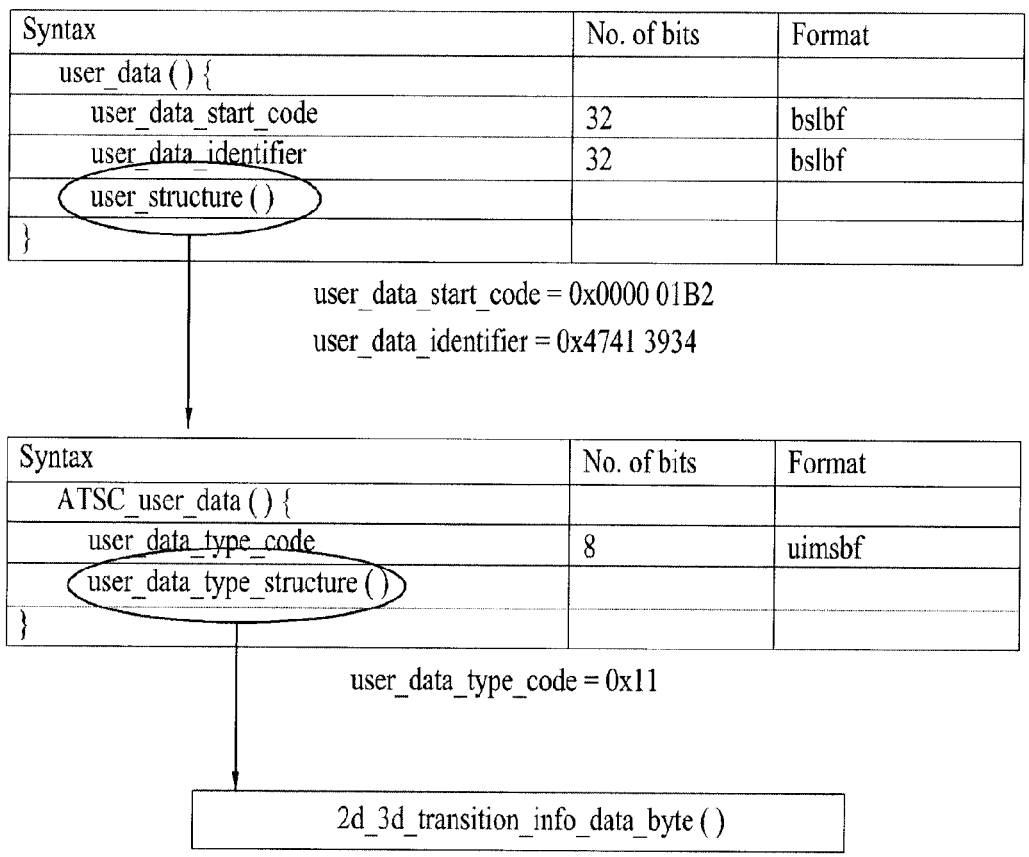
FIG. 6 is a diagram of a method of transporting a 2D_3D_transition_info_data_byte according to one embodiment of the present invention in an MPEG-2 video.

FIG. 6 is a diagram of a method of transporting a 2D_3D_transition_info_data_byte according to one embodiment of the present invention in an MPEG-2 video.

The 2D_3D_transition_info_data_byte may be able to signal a timing point of conversion in a base view video stream. A receiver refers to a user_structure( ) included in the user_data( ) of the base view video stream of the MPEG-2 video. In this case, a user_data_start_code corresponds to '0*0000 01B2' and a user_data_identifier refers to an ATSC_user_data( ) having a value of '0*4741 3934'. Lastly, it is able to obtain information on the timing point of conversion from the 2D_3D_transition_info_data_byte having a value of 'a user_data_type_code='0*11' in the user_data_type_structure( ).

In case that the MPEG-2 video corresponds to an additional view video stream, information on a conversion from 3D to 2D can be signaled via the 2D_3D_transition_info_data.

The 2D_3D_transition_info_data is transmitted in a manner of being included in the user_data( ) of the Picture Extension and User Data region. The receiver extracts the user_data( ) satisfying a condition that the user_data_start_code value corresponds to '0*0000 01B2' and the user_data_identifier value corresponds to '0*4741 3934'. The receiver extracts data satisfying a condition that the user_data_type_code corresponds to '0*11' in a manner of reading the data of the user_structure( ). The receiver recognizes a type and a timing point of conversion between 2D and 3D via the 2D_3D_transition_info_data( ).

FIG. 7 is a diagram of a method of transporting a 2D_3D_transition_info_data_byte according to one embodiment of the present invention in an AVC/H.264 video.

The 2D_3D_transition_info_data_byte may be able to signal a timing point of conversion in an additional view video stream. In case of H.264 (or AVC) video, the 2D_3D_transition_info_data_byte transmits a corresponding information to SEI (supplemental enhancement information) region and transmits to make an user_data_registered_itu_t_135( ) include the user_identifier and the user_structure. In particular, the 2D_3D_transition_info_data_byte transports the corresponding information to SEI payloads instead of the user_data( ). The SEI plays a role of the picture extension and user data of the MPEG-2 and can be constrained to have a similar position as well.

In case that the AVC video corresponds to an additional view video stream, information on a conversion from 3D to 2D can be signaled via the 2D_3D_transition_info_data.

The 2D_3D_transition_info_data ( ) is received via an SEI RBSP (raw byte sequence payload). If a nal_unit_type value corresponds to '6' by parsing an AVC NAL unit, it corresponds to a SEI data. The receiver checks a user_identifier value by reading a user_data_registered_itu_t_t35 SEI message satisfying a condition that a payloadType corresponds to '4'. The receiver extracts data satisfying a condition that the user_data_type_code corresponds to '0*11' in a manner of reading the user_structure( ) corresponding to a condition that the user_identifier value corresponds to '0*4741 3934'. The receiver may be able to recognize a timing point of conversion from 3D to 2D in a manner of parsing the 2D_3D_transition_info_data( ).

Figure 8:
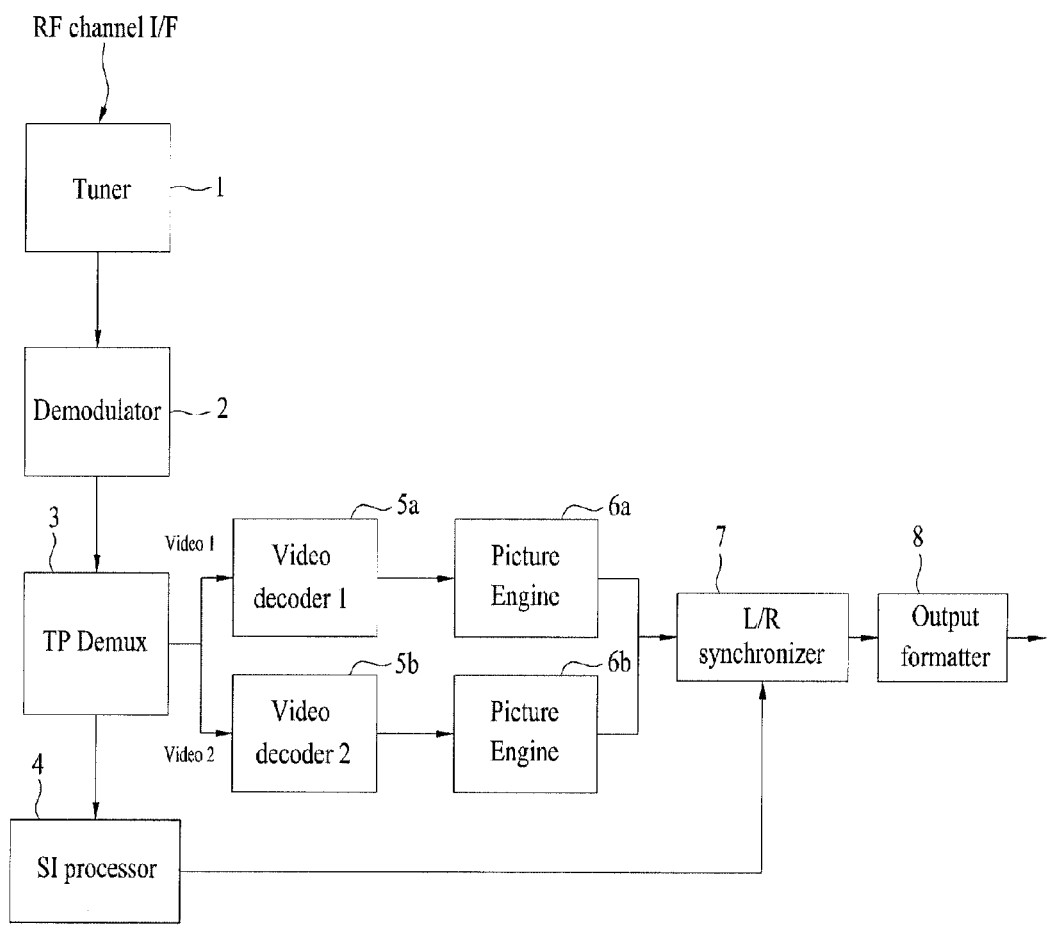
FIG. 8 is a diagram of a structure of a receiver for receiving and outputting a 3D stereoscopic broadcasting in a dual stream case according to one embodiment of the present invention.

FIG. 8 is a diagram of a structure of a receiver for receiving and outputting a 3D stereoscopic broadcasting in a dual stream case according to one embodiment of the present invention.

The receiver may include a tuner 1, a demodulator 2, a TP demux 3, an SI processor 4, video decoder 1 and 2 5a/5b, picture engine 6a/6b, an L/R synchronizer 7, and an output formatter 8. In this case, the TP demux 3, the SI processor 4, and the video decoder 1 and 2 5a/5b can be implemented by a single module and the single module can be called a decoding module.

The receiver receives and demodulates a broadcasting signal via the tuner 1 and the demodulator 2. The demodulated broadcasting signal is demultiplexed by the demux 3. In case of transceiving information on a timing point of conversion in a manner of being included in the transport packet of the aforementioned second method, the information on a timing point of conversion is extracted by the TP demux 3 and is then delivered to the SI processor 4 to be processed. The receiver determines whether the video 2 is decoded and whether the video 2 is image processed using the information on a timing point of conversion and may be then able to determine whether the video decoder 2 5b and the picture engine 6b operate.

The demultiplexed video 1 and video 2 are inputted to the video decoder 1 5a and the video decoder 2 5b, respectively and then decoded. In case of transceiving information on a timing point of conversion in a manner of being included in the MPEG-2 or the AVC/H.264 video of the aforementioned third method, the information on a timing point of conversion is extracted when a decoding is performed in the video decoder. In this case, the receiver determines whether the video 2 is decoded and whether the video 2 is image processed using the information on a timing point of conversion and may be then able to determine whether the video decoder 2 5b and the picture engine 6b operate.

Each of the decoded video 1 and 2 is inputted to the L/R synchronizer 7 after going through the picture engine 6a/6b, respectively and then synchronizes a left image and a right image. The synchronized left and right image are inputted to the output formatter 8 and then provided to a user as a 3D image.

Figure 9:
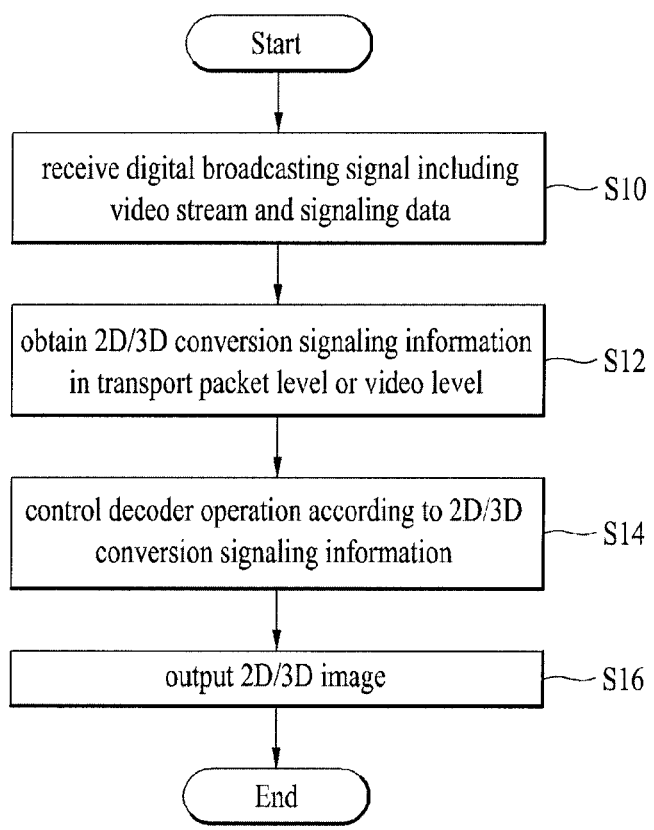
FIG. 9 is a flowchart of a method of receiving a broadcasting signal according to a screen conversion between 2D and 3D according to one embodiment of the present invention.

FIG. 9 is a flowchart of a method of receiving a broadcasting signal according to a screen conversion between 2D and 3D according to one embodiment of the present invention.

The receiver receives a digital broadcasting signal including a video stream and a signaling data [S10]. The receiver obtains an adaptation_field( ) in a transport packet level or a signaling information on a conversion between 2D and 3D in a video level [S12]. In this case, the acquisition of the signaling information in the video level is achieved from the user_data_type_structure( ) in case of the MPEG video and is achieved from the SEI region in case of the AVC/H.264 video.

According to the obtained information on the conversion between 2D and 3D, the receiver controls the operation of the video decoder 1 and 2 [S14]. In case of a conversion from 2D to 3D, the receiver makes both the video decoder 1 and 2 operate. In case of a conversion from 3D to 2D, the receiver temporarily stops the operation of the video decoder 2.

The receiver outputs an image signal outputted from the video decoder [S16] and then provides the image signal to a user.

In the following description, a $2^{nd}$ embodiment of the present invention is described. In case that a broadcasting signal supporting a full resolution is received, a method of signaling whether a corresponding broadcasting signal corresponds to a frame-compatible compatible signal or a 2D service compatible signal and apparatus therefor making an L/R splitter of a receiver suitably operate according to a various types of signal is explained. The $2^{nd}$ embodiment of the present invention proposes a method for a 3DTV based on a multi-layer codec to deal with two types of stereo 3D broadcasting modes different from each other. In particular, the $2^{nd}$ embodiment of the present invention proposes an appropriate signaling method and a method of controlling a 3D display output based on a corresponding signaling.

Figure 10:
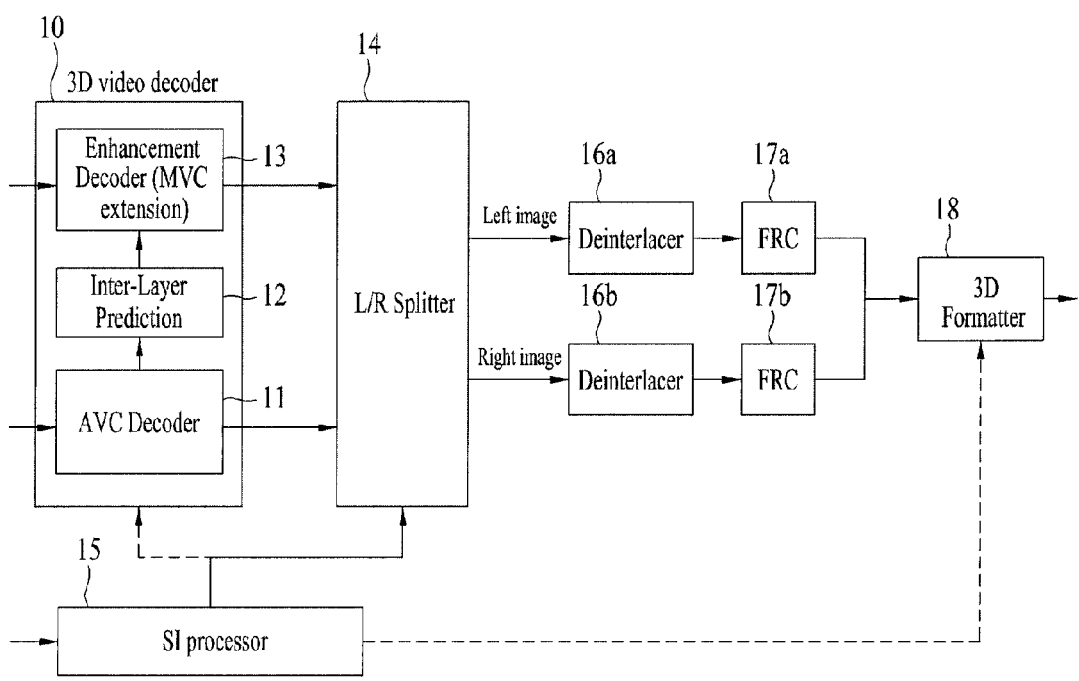
FIG. 10 is a diagram of a basic structure of a 3D image signal receiver having an MVC decoder according to one embodiment of the present invention.

FIG. 10 is a diagram of a basic structure of a 3D image signal receiver having an MVC decoder according to one embodiment of the present invention.

A basic structure from a 3D video decoder module 10 to a 3D formatter 18 of a receiver supporting a stereo 3D broadcasting is shown in FIG. 10. The video streams outputted from the multi-layer video decoder 10 are divided into a left image and a right image via the L/R splitter module 14. For clarity, an MVC decoder is explained as an example in the present embodiment.

The MVC decoder decodes a base view video stream with an AVC decoder 11, performs an inter-layer prediction 12 based on the result of the decoding and then inputs to an enhancement decoder 13. The enhancement decoder 13 decodes an additional view video stream in a manner of combining the result of the inter-layer prediction 12 and an inputted additional view video stream data. An image decoded in the AVC decoder 11 and the enhancement decoder 13 is inputted to the L/R splitter 14 and is then divided into a left image and a right image. Each of the divided left image and the right image is provided to a user as a 3D image via the 3D formatter 18 after going through a deinterlacer 16a/16b and a frame rate controller (FRC) 17a/17b, respectively. In this case, an SI processor 15 delivers signaling information to the 3D video decoder module 10 and the L/R splitter 14 and may be able to make the decoder and the splitter suitably operate according to a type of a 3D broadcasting service.

A legacy receiver may be able to perform an operation limited to either a (2D) service-compatible 3D broadcasting service or a frame-compatible compatible (FCC) 3D broadcasting service. The present invention includes a scenario realizing a 3D output and a 2D output for all cases. To this end, a new receiver operation mechanism in the L/R splitter 14 and a signaling in a system layer via an SI are required.

Figure 11:
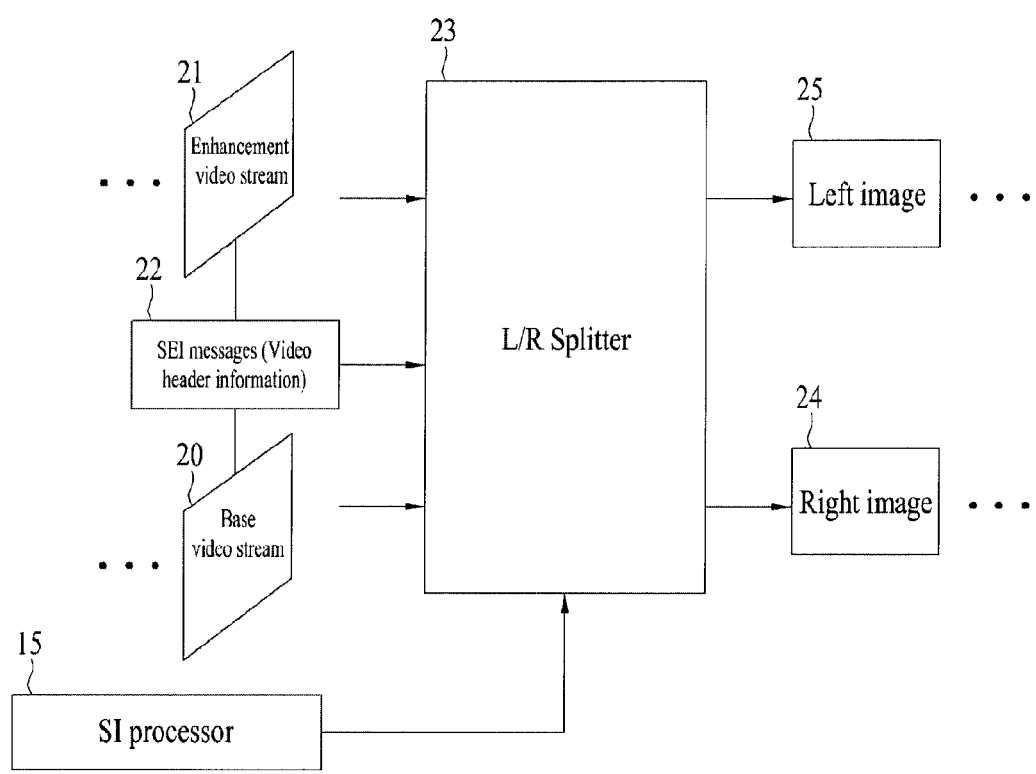
FIG. 11 is a diagram of a basic structure of an L/R splitter according to one embodiment of the present invention.

FIG. 11 is a diagram of a basic structure of an L/R splitter according to one embodiment of the present invention.

A base stream 20 and an enhancement stream 21 corresponding to the input value of the L/R splitter module 23 are differently processed according to a stereo broadcasting mode.

In case of a frame-compatible compatible 3D broadcasting, the video stream 20 transmitted to a base layer corresponds to an image of a frame-compatible 3D form. The video stream 21 transmitted to an enhancement layer may also correspond to an image of the frame-compatible 3D form or may correspond to a data of a different form in some cases.

In case of a service-compatible compatible 3D broadcasting, the video stream 20 transmitted to the base layer corresponds to an image of a 2D form compatible with a legacy full HD 2D broadcasting. The video stream 21 transmitted to the enhancement layer may also correspond to an image of the 2D form or may correspond to a data of a different form such as a depth map in some cases.

The L/R splitter 23 combines two video streams 20/21 to coincide with a type of a 3D broadcasting delivered from the SI processor 15 or an SEI messages 22 and may be able to output a right image 25 and a left image 25 of full resolution with the result of the combination.

A method of combining a stream varies according to each mode and the method is described in the following description.

FIG. 12 is a diagram of a method of supporting 2 types of full resolution 3D image signals (HD stereo mode) based on an MVC codec according to one embodiment of the present invention.

FIG. 12(a) is a diagram of operation of the L/R splitter 23 in case that a received signal corresponds to a frame-compatible compatible mode.

A frame-compatible compatible mode service is a structure compatible with a conventional frame-compatible (phase 1) service. An image signal consists of a base layer (Lb/Rb) 31 corresponding to a phase 1 3DTV and an enhancement layer (Le/Re) 32. First of all, a video signal (Lb/Rb) received via the base layer is divided into a left and right image of a half resolution via a local splitter in the L/R splitter 23 after a decoding is performed. And, a video signal (Le/Re) received via the enhancement layer is also divided into a left and right image of a half resolution via a local splitter in the L/R splitter 23 after a decoding is performed. The video signal split after the decoding generates a full resolution image in a manner of being merged by an identical eye-view unit.

In particular, a full resolution left image (Lf) 34 is generated by combining the Lb with the Le and a full resolution right image (Rf) 33 is generated by combining the Rb with the Re. Consequently, this full resolution image pair (the Lf and the Rf) is went through the 3D formatter and is then finally outputted via a 3D display.

FIG. 12(b) is a diagram of operation of the L/R splitter 23 in case that a received signal corresponds to a 2D compatible mode.

A 2D compatible mode service is a structure compatible with a conventional 2D HD service. An image signal consists of a base layer corresponding to an HD service (2D) and an enhancement layer. In this case, one eye-view among the left and the right is selected and transmitted via the base layer and the remaining eye-view is transmitted via the enhancement layer. According to the present embodiment, the left image (Lb) 35 is transmitted via the base layer and the right image (Re) 36 is transmitted via the enhancement layer. It is possible to transmit the right image (Rb) via the base layer and transmit the left image (Le) via the enhancement layer according to embodiment.

The received base and enhancement layer are outputted to corresponding view positions after going through switching (blocks represented by 1 and 2) according to eye-views, which correspond to the base and enhancement layer, respectively. In particular, according to whether the base layer is left or right, it is determined whether a matching is heading to the Lf 34 or the Rf 33. The reconstructed full resolution videos (the Lf and the Rf) are finally outputted via the 3D display after going through the 3d formatter, respectively.

A full resolution 3D broadcasting can be outputted by combining the stream received via the base layer with the stream received via the enhancement layer in case of both the frame-compatible compatible mode and the 2D compatible mode. Although a received stream is different, an output, which corresponds to a full HD left image and a full HD right image, outputted from the L/R splitter module is identical. Hence, if a single L/R splitter module supports all of the processing methods of FIGS. 12(a) and (b), a receiver may be able to provide a full resolution 3D broadcasting no matter what mode is received by the receiver. In the following description, a method of signaling which mode is used to transceive a full resolution 3D broadcasting signal is explained.

A major part of a signaling is to indicate that which 3D mode is used. A needed information for outputting per each mode is as follows.

In case of the frame-compatible compatible mode, a format type of a broadcasting signal should be signaled. For instance, the format type may correspond to a side by side type, a top and bottom type, a checkerboard type, or the like. A position of a left and right image and sampling mode (even, odd) information should be signaled together.

In case of the 2D service compatible mode, the position information of the left and the right image indicating whether a base layer stream corresponds to a left image or whether an enhancement layer stream corresponds to the left image should be signaled.

Mode information and detail information per each mode can be delivered via a signaling in a video level, the signaling in a system level, or the signaling in a transport packet level.

In case of signaling a 3D mode in the video level, two methods, i.e., expansion of a legacy SEI message or designation of a new SEI message can be used.

In case of signaling the 3D mode in the system level, a component type, a new descriptor, or a service type can be used.

In case of signaling the 3D mode in the transport packet level, count information and/or 3D mode information in the method of using an adaptation layer can be used.

In terms of using the aforementioned three methods, if a conversion between 3D modes occurs in the middle of watching, it is difficult to precisely handle a timing point of conversion with the signaling in the system level only. Thus, it is necessary to inform the conversion information between 3D modes by the video level. Hence, a method of signaling by the transport packet level or the video level is necessary. In particular, the signaling of the system level should be accompanied by the signaling of the video level or the transport packet level.

FIG. 13 is a diagram of a syntax structure to signal in a video level according to one embodiment of the present invention.

In case of an H.264 (or AVC) video, it is able to signal by utilizing an SEI (supplemental enhancement information) region.

FIG. 13(a) is a diagram of an SEI syntax structure to transmit a stereo_3D_info_data( ) according to one embodiment of the present invention. It is transmitted to include a user identifier and a user structure in a user_data_registered_itu_t_135( ). A video stream in which an information is included may correspond to both a base layer and an enhancement layer. A signaling can be performed by two methods, i.e., expanding a conventional SEI message and designating a new SEI message.

First of all, a method of expanding a conventional SEI message can be used by expanding a syntax structure depicted in FIG. 13 to send an auxiliary data to a video elementary stream. In an SEI syntax in FIG. 13(a), the user_identifier and the user_structure use '0*4741 3934 ('GA94') and a DVB1_data( ) value as shown in FIG. 13(b). In this case, as shown in FIG. 13(c), a user_data_type_code and a user_data_type_structure( ) in the DVB1_data are used by assigning an expanded value to transmit 3D stereo related information to the user_data_type_code and the user_data_type_structure( ). In this case, values to be assigned are shown in FIG. 13(d). The value of the user_data_type_code according to one embodiment of the present invention corresponds to '0*04' and the content of the user_data_type_structure( ) may correspond to 'stereo_3D-info_data( ).

FIG. 14 is a diagram of a syntax structure of a stereo_3D_info_data( ) according to one embodiment of the present invention.

A stereo_3D field is a field indicating that a current stream belongs to which type of stereo 3D service. An available 3D mode may include a frame-compatible compatible 3D service, a 2D service compatible 3D service, and the like.

An LR_first field is a field indicating whether a pixel situating at the very left in a screen configuring a frame-compatible 3D service for a current layer (or a stream) is left or a right.

A stereo_format field is a field indicating a type of a stereo_format of a current layer (or a stream). The type of the stereo format may include a side-by-side, a top-and-bottom, a checkerboard, and the like.

A left_view_sampling_mode field means a left image sampling mode for a current layer (or a stream). In case that the stereo_format corresponds to the side-by-side, this field indicates whether a sampling of a vertical direction extracted an even line or an odd line. In case that the stereo_format corresponds to the top-and-bottom, this field indicates whether a sampling of a horizontal direction extracted an even line or an odd line. In case of the checkerboard format, this field also indicates that which mode is used among the two available methods.

A right_view_sampling mode means a right image sampling mode for a current layer (or a stream). Details are identical to the left_view_sampling_mode field.

An LR_flag field is a field indicating whether a stream corresponding to a base layer among the streams configuring a 2D service compatible 3D service is left or a right. This can be signaled in a way of indicating whether a stream to which a corresponding data is delivered is left or a right.

In the following description, a method of configuring a new SEI message is explained. This corresponds to a case that a new SEI message is individually defined to indicate a 3D service mode without using the aforementioned user_data_registered_itu_t_135( ). This method uses a following method.

FIG. 15 is a diagram of a method of signaling a 3D service mode by configuring an SEI message according to one embodiment of the present invention.

An sei_message in FIG. 15(a) includes a payloadType field. The payloadType field may be able to define a type of each sei_payload. Hence, in case that a payloadType corresponds to a value of '36' in the sei_payload syntax structure in FIG. 15(b), a 3D service mode can be signaled using a stereo_3D_info in FIG. 15(c).

The stereo_3D_info includes the stereo_3D_mode, the LR_first, the stereo_format, the left_view_sampling_mode, a right_view_sampling_mode, and the LR_flag field. Explanation on each field is already explained in the above description.

In case of signaling a 3D mode in a system level, it may be able to use a component type of a DVB SI, a 3D stereo descriptor, or a service type.

Since a signaling using the component type in the system level informs a type of each stream via a value of a stream_content and a component_type, it is able to judge a 3D mode to which a broadcasting signal belongs thereto and an L/R configuration method in a manner of checking a component value of a stream.

FIG. 16 is a diagram of a definition for a stream_content and a component_type according to one embodiment of the present invention. When a 3D mode is signaled in a system level, a stream_content is set to '0*05'. A component_type has a value ranging from '0*84 to 0*8b'. According to each of the values, the mode of a full resolution 3D broadcasting signal is determined. In case of a frame-compatible compatible mode, a side-by-side type or a top-and-bottom type is determined. And, in case of a 2D service compatible mode, a left image or a right image is determined. A receiver identifies the 3D mode and a 3D screen configuration according to a component type (the stream_content and the component_type). The identified information is delivered to the L/R splitter and can be used to extract a left and a right image of full HD.

Similar to this, the 3D mode signaling in the system level can be performed based on an ATSC PSIP in case of an ATSC scheme. It is able to use TVCT and EIT of the PSIP. The TVCT uses a method of transmitting fields of the stereo_3D_info_data using a descriptor of a virtual level. And, the EIT may be able to signal a 3D service mode for a future event in a manner of transmitting field information of the stereo_3D_info_data using a descriptor of an event level.

A method of signaling in a system level using a descriptor can use a 3D_stereo_info_descriptor. This is situated at the descriptor attached to each elementary stream inside of an SDT section of a DVB. In particular, the 3D_stereo_info_descriptor is situated at a base layer stream or an enhancement layer stream. Details are already described in FIG. 14 and may include identical field. A receiver identifies a 3D mode information and a 3D screen configuration information in a manner of parsing a stereo_3D_info_descriptor( ) included in the base layer or the enhancement layer.

The 3D mode can also be signaled in the system level using a service_type and a service configuration may have two types as follows. There may exist a case that a stream delivered via the base layer and a stream delivered via the enhancement layer belong to an identical service or a case that the stream delivered via the base layer and the stream delivered via the enhancement layer belong to a service different from each other.

FIG. 17 is a diagram of a kind of a service type according to one embodiment of the present invention. First of all, in case that a stream delivered via the base layer and a stream delivered via the enhancement layer belong to an identical service, a service_type of a 2D service compatible 3D service corresponds to '0*22' and the service_type of a frame compatible 3D service corresponds to '0*1F'. From this, it is able to signal that it corresponds to a phase 2 (2D service compatible) 3DTV service.

As a different case, in case that a stream delivered via the base layer and a stream delivered via the enhancement layer belong to a service different from each other, a service including the stream corresponding to the base layer corresponds to '0*19' or '0*1C' and a service including the stream corresponding to the enhancement layer can be signaled in a manner of designating with such a new service_type form as '0*25' and '0*28'. In case of being transmitted to a service different from each other, the type of the 3D mode can be identified if one of the two services is checked only.

A receiver identifies the 3D mode information in a manner of checking the service_type value via the aforementioned signaling signal. Detail information can be identified based on the component type value or the content of the stereo_3D_info_descriptor( ) included in the signal after parsing each element. The identified information is delivered to the L/R splitter module and can be used to extract a left and right image of full HD.

A signaling in a transport packet level can be performed using an adaptation layer.

FIG. 18 is a syntax structure of a transport_packet( ) according to one embodiment of the present invention. For a signaling in the transport packet level, an adaptation_field( ) in a transport_packet( ) can be used. Specifically, it is able to signal using a private_data_byte( ) field in the adaptation_field( ). The adaptation_field( ) is described in detail in FIG. 19.

FIG. 19 is a syntax structure of an adaptation_field( ) according to one embodiment of the present invention. In this case, the private_data_byte included in the adaptation_field( ) contains an identical content with the stereo_3D_info_data( ) suggested in the aforementioned video level signaling.

In the adaptation_field( ), a transport_private_data_flag indicates whether the private_data_byte exists. A transport_private_data_length signals a byte number of the private_data_byte and the private_data_byte includes the content of the stereo_3D_info_data( ).

Operation sequence of a receiver is as follows. The receiver checks that the transport_private_data_flag of the adaptation_field( ) corresponds to '1'. After checking that the transport_private_data_flag corresponds to '1', the receiver checks the number of byte of the private_data_byte using the transport_private_data_length. If the stereo_3D_info_data( ) is signaled via the private_data_byte, the receiver identifies a 3D mode and the information on a stereo broadcasting configuration by reading the signaling information. The receiver controls the output of the L/R splitter module receiving the base stream and the enhancement stream as an input value using the identified information.

As mentioned in the foregoing description, in case that the receiver receives a 3D image signal, an operation of the receiver varies according to each mode. Moreover, the operation of the receiver may vary according to a 3D mode even in case of watching a 2D view.

In case of a 2D service compatible 3D service, the receiver may be able to display a 2D screen in a manner of selecting either the base layer stream or the enhancement layer stream. In particular, in this case, it is not necessary to go through the L/R splitter module.

In case of a frame-compatible compatible 3D service, since each half of the screen configuring a 2D screen is delivered to the base layer and the enhancement layer, respectively, the receiver may be able to display a 2D in a manner of selecting one of the L/R images went through the L/R splitter.

Figure 20:
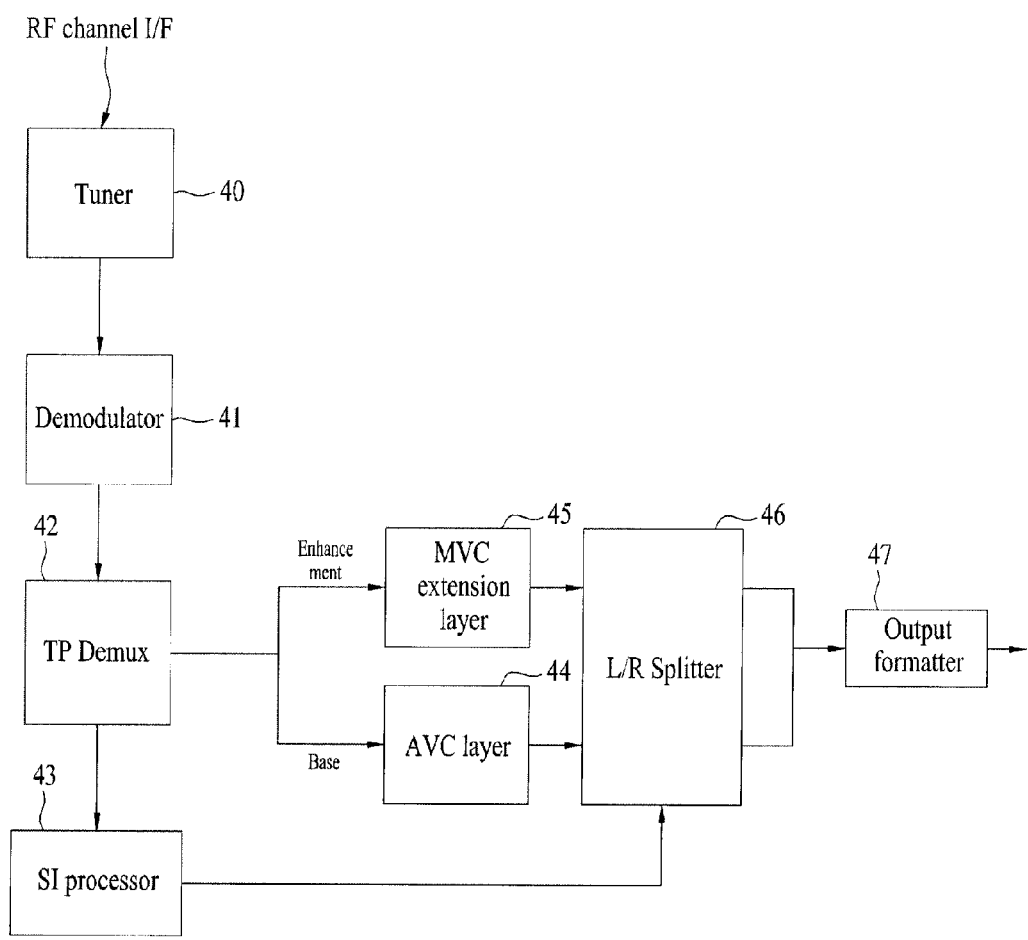
FIG. 20 is a diagram of a structure of a receiver to receive and output a 3D stereoscopic broadcasting according to one embodiment of the present invention.

FIG. 20 is a diagram of a structure of a receiver to receive and output a 3D stereoscopic broadcasting according to one embodiment of the present invention.

The receiver may include a tuner 40, a demodulator 41, a TP demux 42, an SI processor 43, an AVC layer decoder 44, an MVC extension layer decoder 45, an L/R splitter 46, and an output formatter 47. In this case, the TP demux 42, the SI processor 43, and the AVC layer decoder/the MVC extension layer decoder 44/45 can be implemented by a single module and the single module can be called a decoding module.

The receiver receives and demodulates a broadcasting signal via the tuner 40 and the demodulator 41. The demodulated broadcasting signal is demultiplexed by the TP demux 42. In case of transceiving information on a 3D mode in a manner of being included in the aforementioned transport packet, the information on a timing point of conversion is extracted by the TP demux 42 and is then delivered to the SI processor 44 to be processed.

The demultiplexed base layer video and the enhancement layer video are inputted to the AVC layer decoder 44 and the MVC extension layer decoder 45, respectively and then decoded. In case that the 3D mode information is signaled in a video level, the receiver may be able to obtain the 3D mode information in this decoding process.

Both the decoded base layer video and the enhancement layer video are inputted to the L/R splitter 46 and then merged, switched, or bypassed according to the signaled 3D mode, and then outputted as a left image and a right image of full resolution. The outputted left and right image are inputted to the output formatter 47 and then provided to a user as a 3D image.

Figure 21:
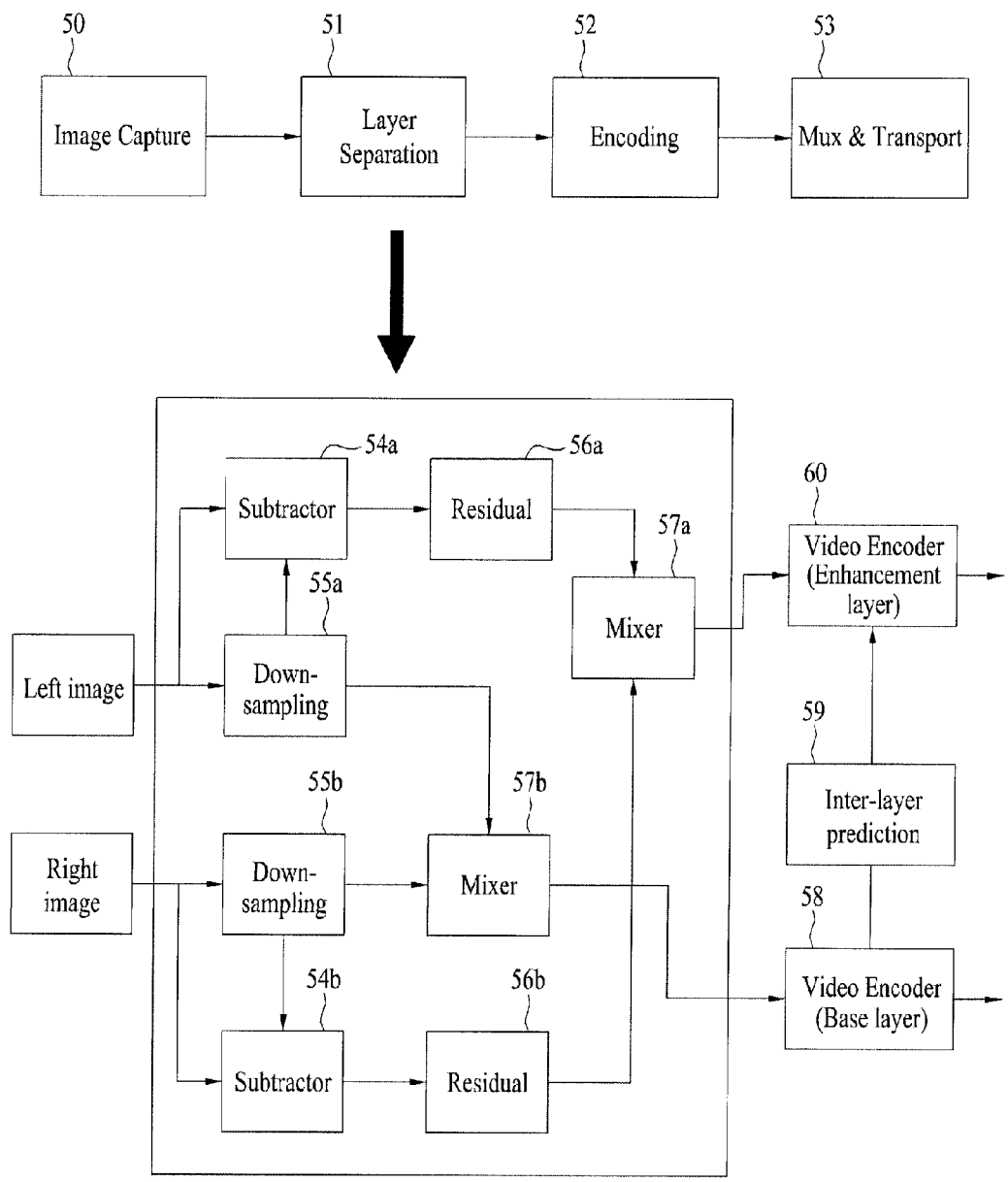
FIG. 21 is a diagram of a structure of a transmitter for a frame-compatible compatible 3DTV service according to one embodiment of the present invention.

FIG. 21 is a diagram of a structure of a transmitter for a frame-compatible compatible 3DTV service according to one embodiment of the present invention. The transmitter structure operates according to the steps of obtaining a left/right image (image capture 50), dividing the obtained image into a left and a right and dividing a layer according to a service mode (layer separation 51), encoding a video for each layer (encoding 52), and multiplexing & transmitting (mux & transport 53). In this case, the present invention explains the layer separation step for full resolution.

The transmitter may include a subtractor 54a/54b, a down-sampling unit 55a/55b, a residual unit 56a/56b, a mixer 57a/58b, a base layer video encoder 58, an inter-layer prediction 59, and an enhancement layer video encoder 60.

In case of a frame-compatible compatible service mode, the transmitter performs a down-sampling 55a/55b for a left and right image to generate a frame compatible (side-by-side, top-and-down) video signal. The transmitter goes through the subtractor 54a/54b to separate a residual signal of a left/right image of full resolution and the down-sampled left/right image. The signal went through the subtractor 54a/54b is inputted to the residual unit 56a/56b. The residual signal consists of a remaining signal except the down-sampled left/right image in the left/right image of full resolution.

A result of down-sampling 55a/55b for the left/right image merges via the mixer 57b and is then inputted to the base layer video encoder 58 to be encoded. And, the output value of the residual unit 56a/56b for the left/right image merges via the mixer 57a and is then inputted to the enhancement layer video encoder 60. The enhancement layer video encoder 60 receives the inter-layer prediction (in case of using the MVC codec, inter-view prediction) 59 from the base layer video encoder 58 and then encodes the enhancement layer on the basis of the base layer.

In particular, a broadcasting signal transmitter of the frame-compatible compatible service may include two down-sampling units configured to perform a down-sampling for an inputted original left/right image signal, two subtractors configured to output a difference between the original left/right image signal and a down-sampled left/right image signal, a $1^{st}$ mixer configured to merge the down-sampled left/right image signal, a $2^{nd}$ mixer configured to merge the left/right residual image signals which correspond to the output of the two subtractors, a $1^{st}$ video encoder configured to encode the output of the $1^{st}$ mixer to the base layer, and a $2^{nd}$ video encoder configured to encode in a manner of considering the output of the $2^{nd}$ mixer and the result of the inter-layer prediction from the $1^{st}$ video encoder together.

And, in case of a 2D service compatible mode, since a left and right image are directly inputted to the base layer video encoder 58 or the enhancement layer video encoder 60, a structure of the layer separation module is relatively simple.

Figure 22:
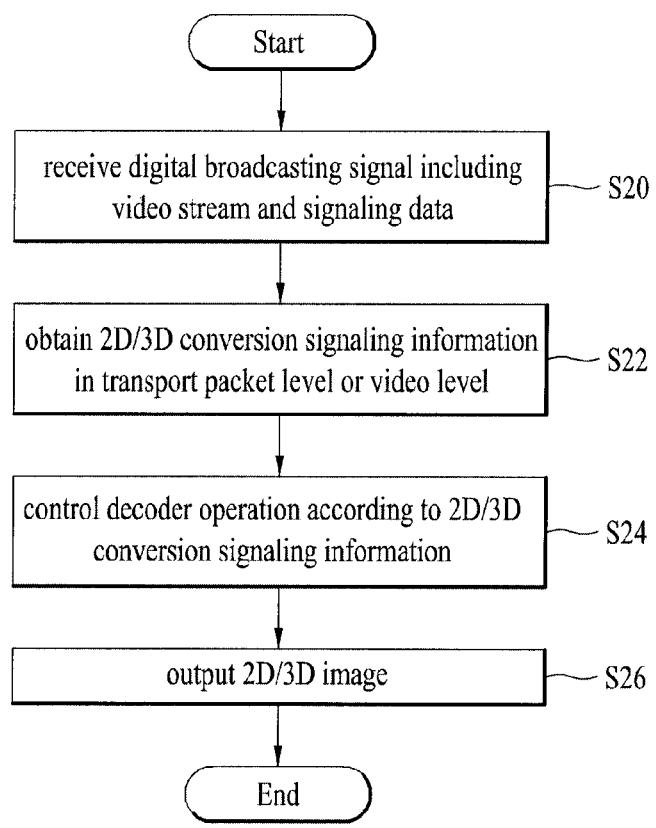
FIG. 22 is a flowchart of a method of receiving a broadcasting signal according to a 3D mode for a full resolution according to one embodiment of the present invention.

FIG. 22 is a flowchart of a method of receiving a broadcasting signal according to a 3D mode for a full resolution according to one embodiment of the present invention.

The receiver receives a video stream and a digital broadcasting signal including a signaling data [S20]. The receiver obtains an adaptation_field( ) in a transport packet level, SI information in a system level, or a signaling information on a 3D service mode in a video level [S22]. In this case, obtaining the signaling information in the video level can be achieved from a user_data_type_structure( ) in case of an MPEG video and can be achieved in an SEI region in case of an AVC/H.264 video.

The receiver controls the operation of the L/R splitter according to the obtained 3D service mode [S24]. In case of the frame-compatible compatible service mode, an inputted image is separated by a local splitter and outputted by merging according to each timing point. In case of the 2D service compatible mode, the inputted image is directly outputted according to a left/right image or is outputted by being switched. Detail explanation is described in FIG. 12.

The receiver outputs an image signal outputted from the L/R splitter [S26] and then provides to a user.

The aforementioned signaling information for a conversion between 2D and 3D mode of the $1^{st}$ embodiment and the signaling information for the conversion between the 2D service compatible mode and the frame-compatible compatible mode of the $2^{nd}$ embodiment can be used in a manner of being transmitted together in a single system as well as being transmitted from systems different from each other. The receiver receives at least one of the aforementioned two signaling signals and processes the signal. The receiver may be able to control the operation of a decoding module according to the corresponding information.

While the present invention has been described and illustrated herein with reference to the preferred embodiments and diagrams thereof, the present invention may be non-limited to the embodiments and it will be apparent to those skilled in the art that various modifications and variations can be made therein without departing from the spirit and scope of the invention. Thus, it is intended that the present invention covers the modifications and variations of this invention that come within the scope of the appended claims and their equivalents.

Mode for Invention

As mentioned in the foregoing description, the related is described in the best mode for invention.

INDUSTRIAL APPLICABILITY

As mentioned in the foregoing description, the present invention can be applied to a whole or a part of a digital broadcasting system.

What is claimed is:

1. A digital broadcasting signal receiving device, comprising:
a tuner configured to receive a digital broadcasting signal comprising service data and signaling data for a service,
wherein the service data comprises a first video stream and a second video stream,
wherein the signaling data comprises first information indicating whether the service is a 2 dimensional(2D) service or a 3 dimensional(3D) service;
a demodulator configured to demodulate the received digital broadcasting signal;

a decoder configured to decode at least one of the first video stream and the second video stream from the demodulated digital broadcasting signal based on the first information, wherein signaling the signaling data takes place after an actual switching of a stream structure from a single video stream to a dual video stream in a case of switching from the 2D service to the 3D service; and an output formatter configured to output the service.

2. The digital broadcasting signal receiving device of claim 1, wherein the decoder extracts a mode conversion information from the demodulated digital broadcasting signal, and wherein the mode conversion information comprises information on a timing point of conversion between the 2D service and 3D service.

3. The digital broadcasting signal receiving device of claim 2, wherein the mode conversion information is received in a manner of being contained in an adaptation_field( ) in a transport packet level or in a video header in a video level.

4. The digital broadcasting signal receiving device of claim 2, wherein the decoder comprises a 1st decoder and a 2nd decoder configured to be controlled whether to operate according to the mode conversion information.

5. The digital broadcasting signal receiving device of claim 2, wherein the mode conversion information comprises information on a conversion between a frame-compatible compatible mode and a 2D service compatible mode.

6. The digital broadcasting signal receiving device of claim 5, wherein the mode conversion information is received in a manner of being contained in an adaptation_field( ) in a transport packet level, in a SI information in a system level, or in a video header in a video level.

7. The digital broadcasting signal receiving device of claim 5, wherein the decoder comprises an L/R splitter configured to separate and merge an inputted image signal in case of the frame-compatible compatible mode and configured to bypass or switch an input image in case of the 2D service compatible mode according to the mode conversion information.

8. A method of receiving a digital broadcasting signal, comprising the steps of:

receiving a digital broadcasting signal comprising service data and signaling data for a service, wherein the service data comprises a first video stream and a second video stream, wherein the signaling data comprises first information indicating whether the service is a 2 dimensional(2D) service or a 3 dimensional(3D) service;

demodulating the received digital broadcasting signal;

decoding at least one of the first video stream and the second video stream from the demodulated digital broadcasting signal based on the first information, wherein signaling the signaling data takes place after an actual switching of a stream structure from a single video stream to a dual video stream in a case of switching from the 2D service to the 3D service; and outputting the service.

9. The method of claim 8, wherein the decoder extracts a mode conversion information from the demodulated digital broadcasting signal, and wherein the mode conversion information comprises information on a timing point of conversion between the 2D service and 3D service.

10. The method of claim 9, wherein the mode conversion information is received in a manner of being contained in an adaptation_field( ) in a transport packet level or in a video header in a video level.

11. The method of claim 9, further comprising the step of controlling an operation of a 1st decoder and a 2nd decoder according to the mode conversion information after the step of extracting the mode conversion information.

12. The method of claim 9, wherein the mode conversion information comprises information on a conversion between a frame-compatible compatible mode and a 2D service compatible mode.

13. The method of claim 12, wherein the mode conversion information is received in a manner of being contained in an adaptation_field( ) in a transport packet level, in a SI information in a system level, or in a video header in a video level.

14. The method of claim 12, further comprising the step of separating and merging an inputted image signal in case of the frame-compatible compatible mode and bypassing or switching an input image in case of the 2D service compatible mode according to the mode conversion information after the step of extracting the mode conversion information.

* * * * *